United States Patent [19]

Murakami et al.

[11] Patent Number: 5,548,321

[45] Date of Patent: Aug. 20, 1996

[54] OPTICAL SCANNING APPARATUS FOR SCANNING LASER BEAM ON IMAGING SURFACE AND RECORDING IMAGE DATA ON IMAGING SURFACE IN UNITS OF DOTS

[75] Inventors: Kazunori Murakami, Shizuoka-ken; Tomonori Ikumi, Numazu; Atsushi Kubota, Shizuoka-ken; Nobuhiko Nakahara, Shizuoka-ken; Nobuyuki Kato, Shizuoka-ken, all of Japan

[73] Assignee: Kabushiki Kaisha TEC, Shizuoka, Japan

[21] Appl. No.: 157,396

[22] Filed: Nov. 23, 1993

[30] Foreign Application Priority Data

Nov. 27, 1992 [JP] Japan .................................. 4-319017
Dec. 24, 1992 [JP] Japan .................................. 4-344689
Oct. 7, 1993 [JP] Japan .................................. 5-251357

[51] Int. Cl.$^6$ ................................................. H04N 1/21
[52] U.S. Cl. .................................... 347/256; 347/247
[58] Field of Search .................................... 347/237, 241, 347/247, 256

[56] References Cited

U.S. PATENT DOCUMENTS 4,410,234  10/1983  Mikami et al. .
4,717,925   1/1988  Shibata et al. .
4,803,367   2/1989  Murase et al. .
4,962,981  10/1990  Murakami et al. .
4,975,626  12/1990  Yagi et al. .

FOREIGN PATENT DOCUMENTS 2-131212  5/1990  Japan .
2-131213  5/1990  Japan .

*Primary Examiner*—Mark J. Reinhart
*Attorney, Agent, or Firm*—Frishauf, Holtz, Goodman, Langer & Chick

[57] ABSTRACT

Dot width data of a plurality patterns each corresponding to a recording range in one scanning operation are stored in a memory in advance. Each dot width data required to correct an f-$\theta$ error is used to determine each dot width in one scanning operation. In accordance with the operation of an address counter, a bus switching circuit selectively reads out dot width data of a pattern different from a preceding pattern from the memory for each scanning operation, and outputs the data to a latch circuit. A programmable counter determines each dot width of image data on the basis of the dot width data from the latch circuit. A laser diode driver ON/OFF-controls a laser beam from a laser diode on the basis of the image data from the programmable counter.

13 Claims, 9 Drawing Sheets

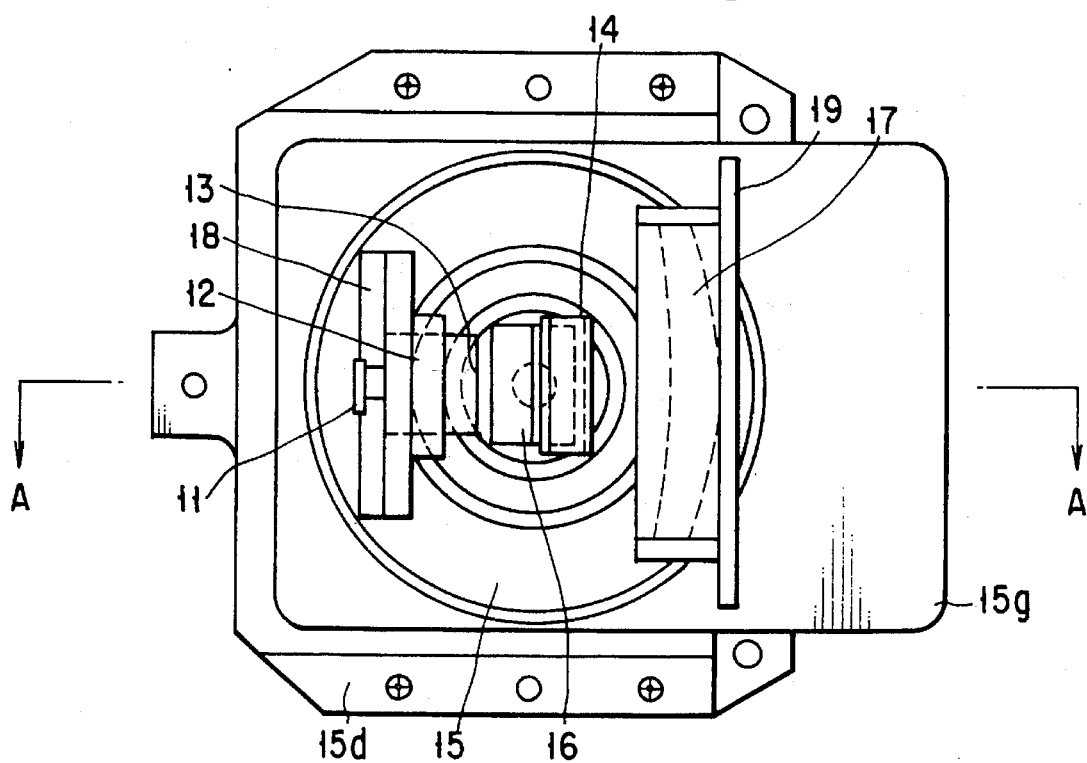
F I G. 1
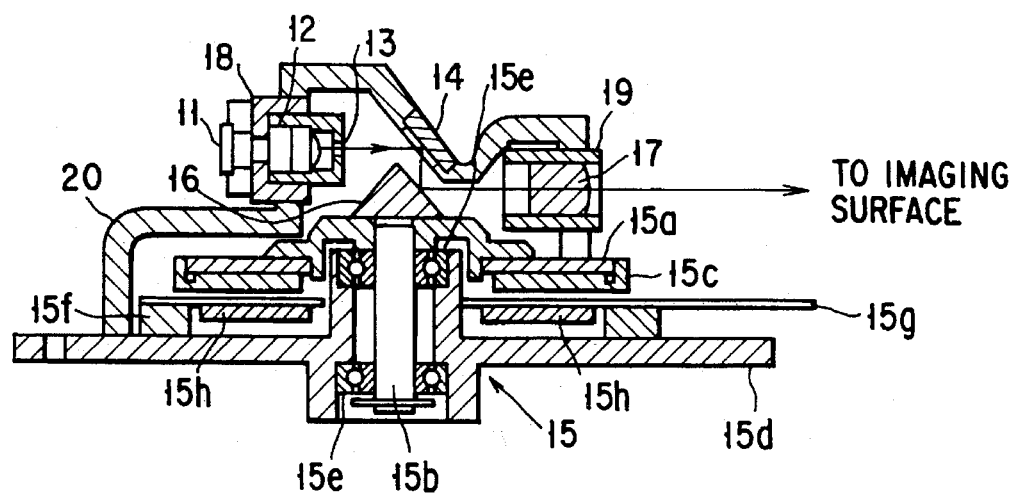
F I G. 2

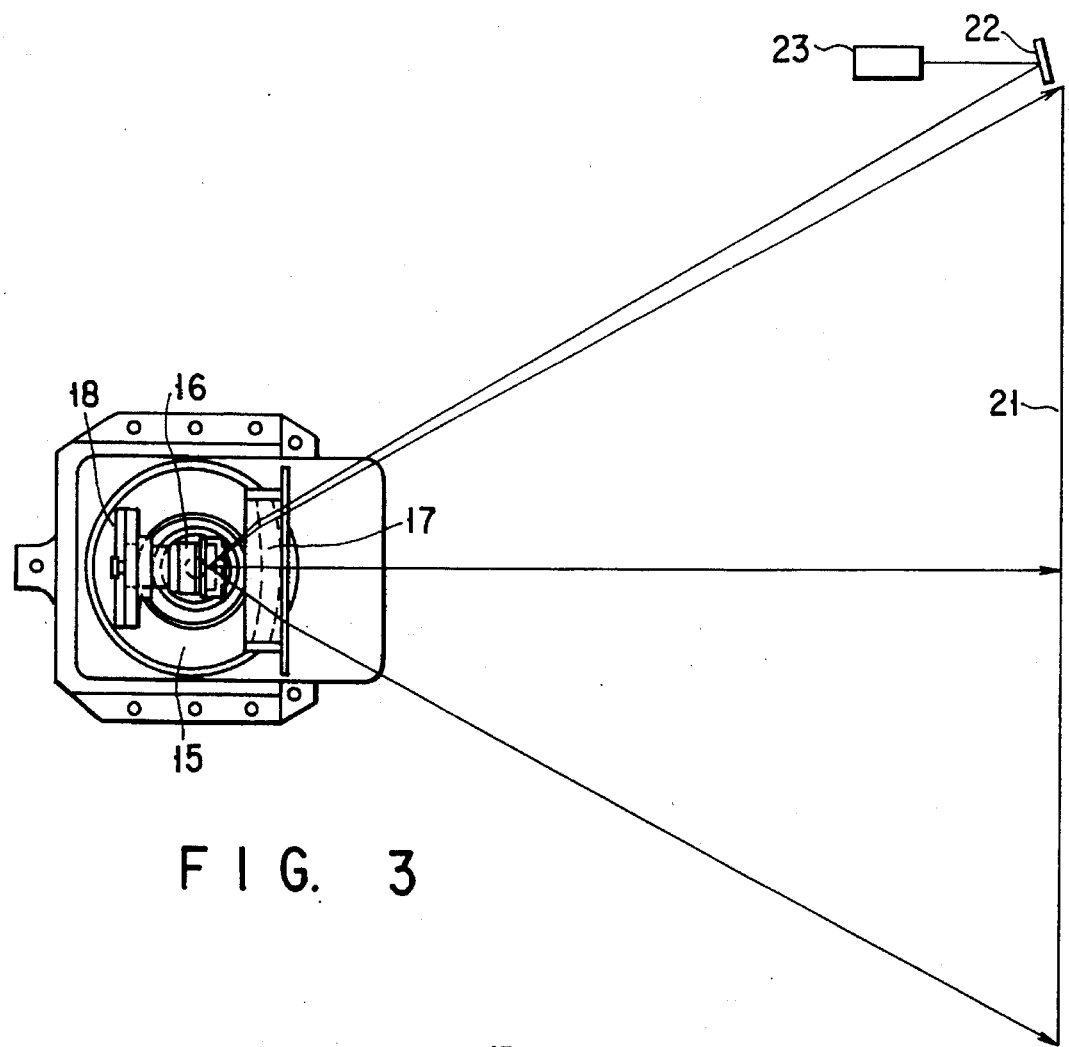
F I G. 3
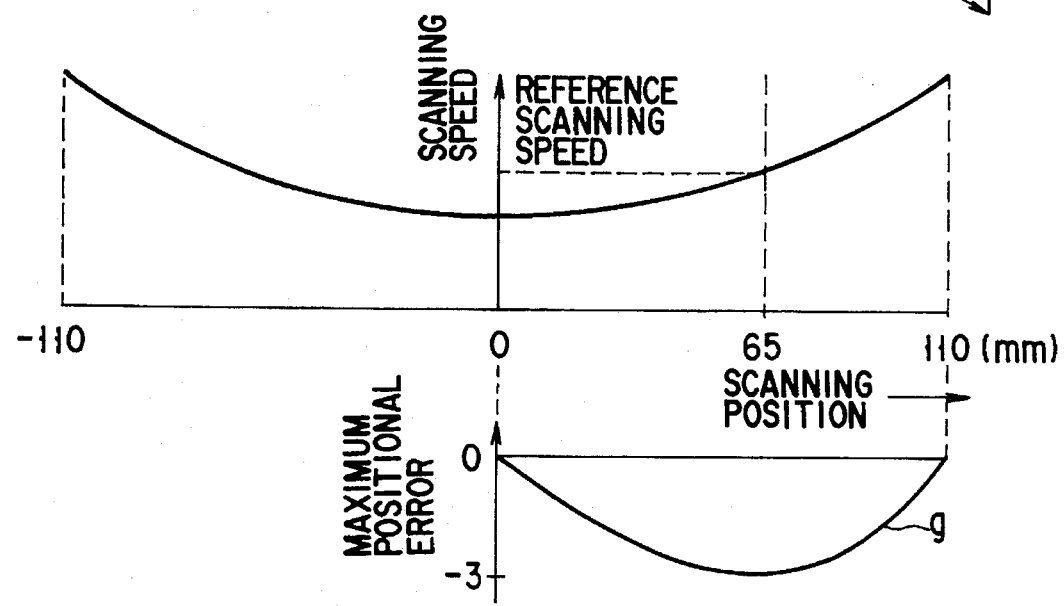
F I G. 4

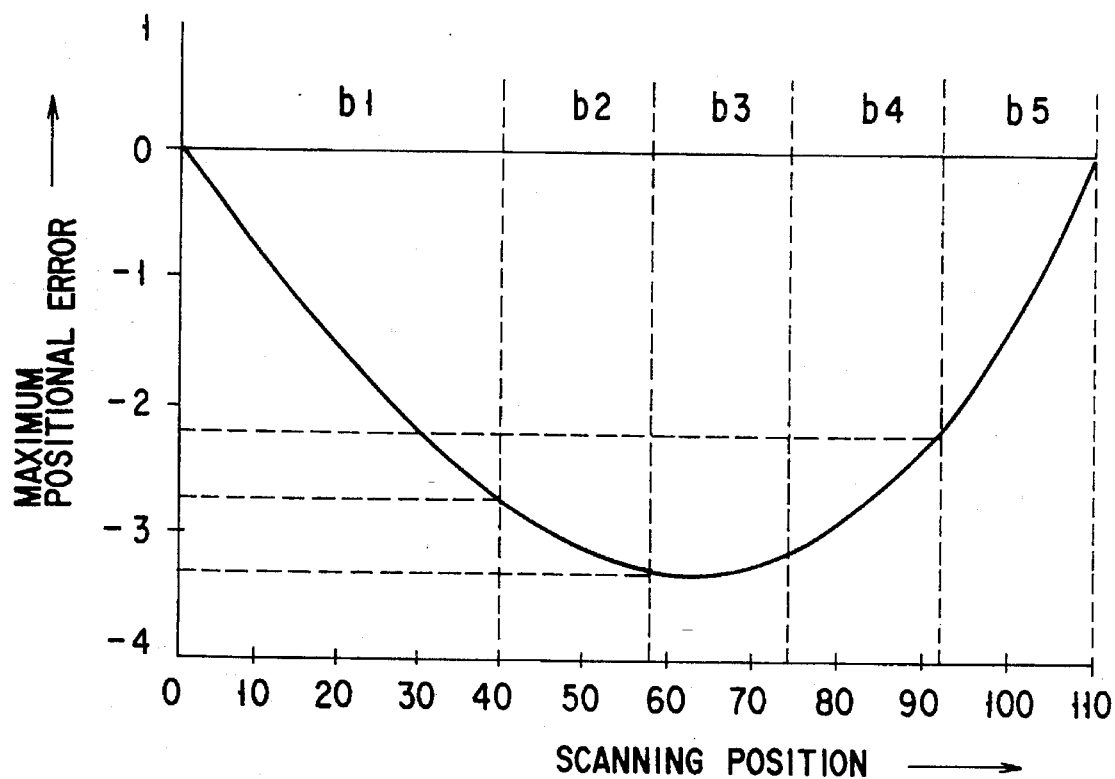
F I G. 5
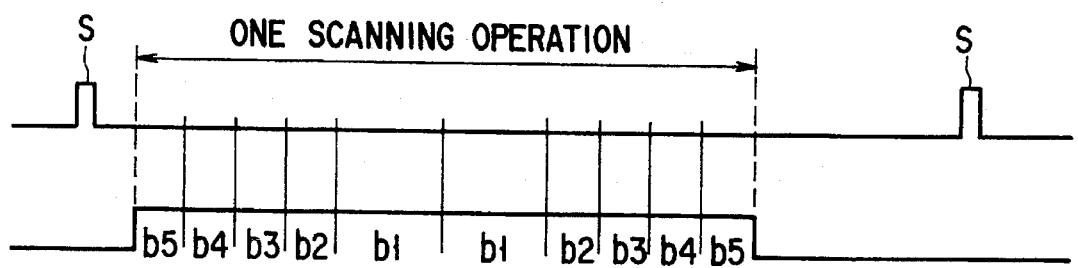
F I G. 6

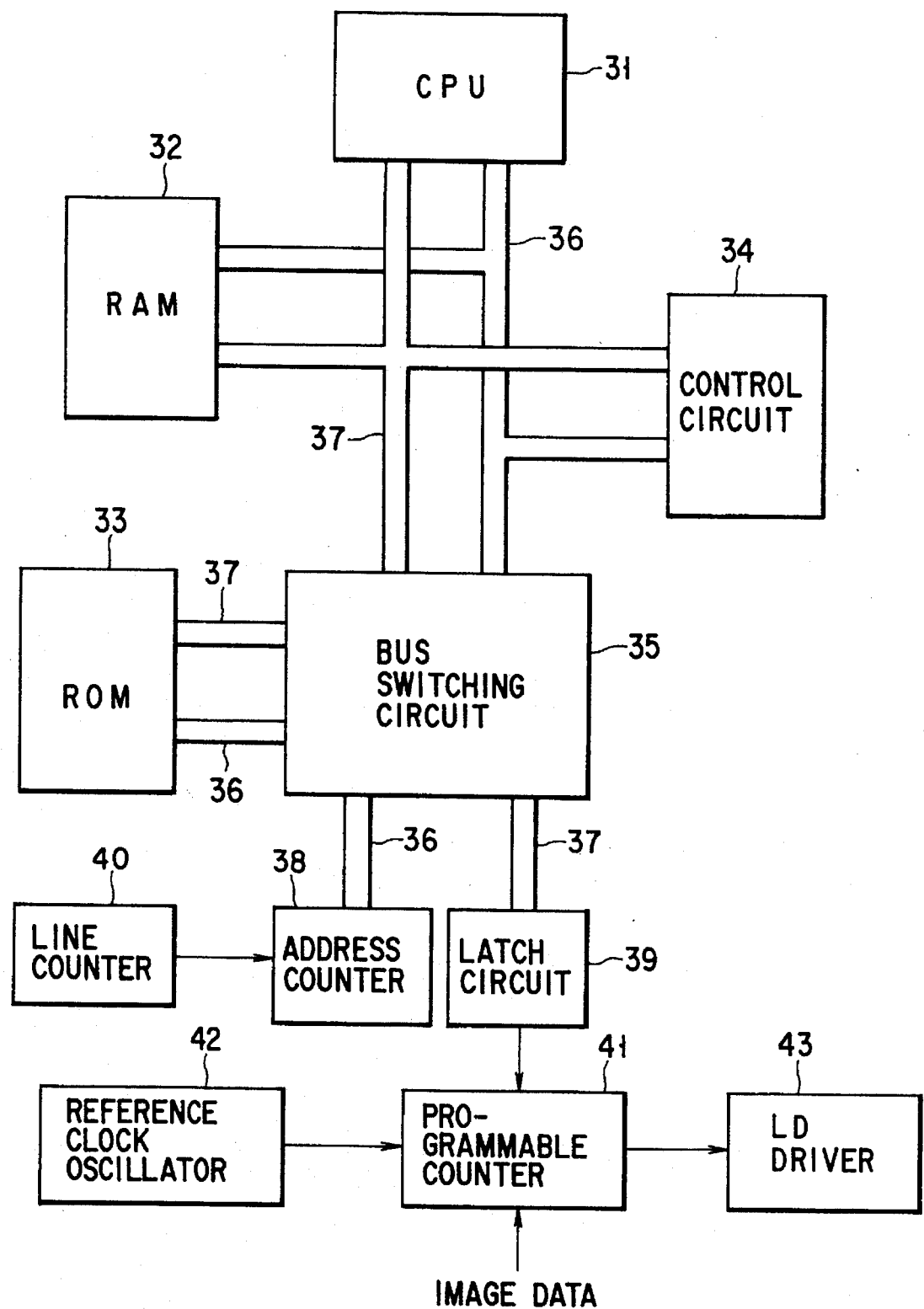
F I G. 7

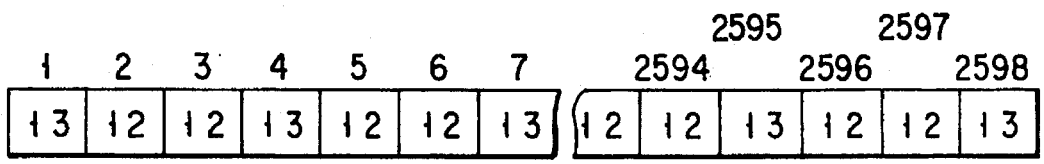
F I G. 11A
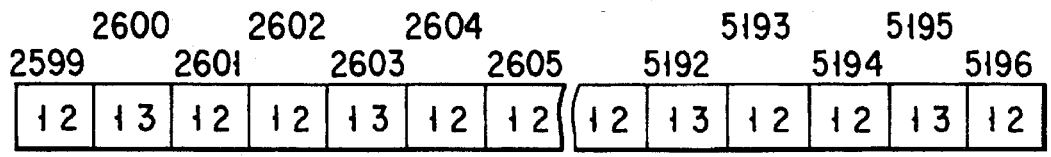
F I G. 11B
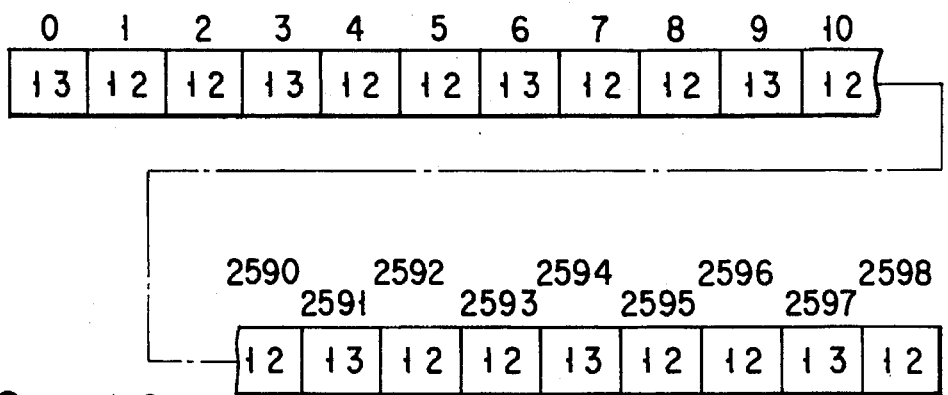
F I G. 12
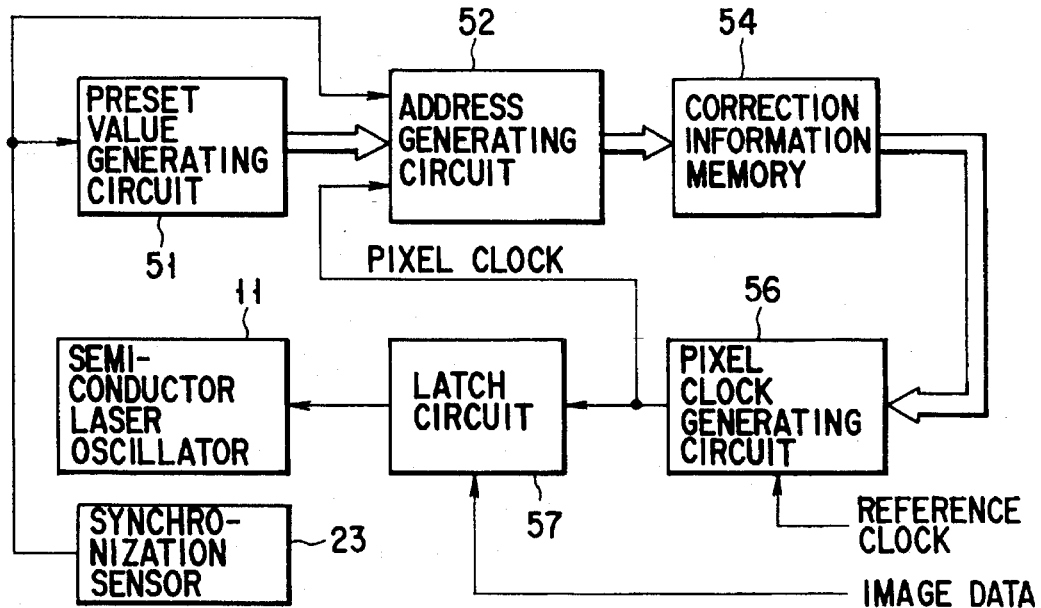
F I G. 13

OPTICAL SCANNING APPARATUS FOR SCANNING LASER BEAM ON IMAGING SURFACE AND RECORDING IMAGE DATA ON IMAGING SURFACE IN UNITS OF DOTS

BACKGROUND OF THE INVENTION

1. Field of the Invention

The present invention relates to an optical scanning apparatus used for an exposure apparatus in a laser printer, a laser facsimile apparatus, a digital copying machine, or the like to scan a laser beam.

2. Description of the Related Art

In general, the exposure optical systems of electrophotographic printers are roughly classified into two types: a system using a solid-state device such as an LED or a liquid crystal shutter; and a system using a scheme of scanning a laser beam.

In a system using the scheme of scanning a laser beam, optical aberrations such as main scanning/subscanning field curvatures, a scanning line curvature, an f-θ error, and the inclinations of reflection surfaces are generally compensated for in a purely optical manner. A structure obtained by combining a plurality of f-θ lenses and a cylindrical lens is used to compensate the inclinations of the reflection surfaces. In some case, in order to simplify the optical system, one surface of an f-θ lens is a toric surface to compensate the inclinations of the reflection surfaces.

An f-θ lens is, however, large in size and high in cost. For this reason, some known system is designed to perform optical aberration correction by using a combination of an elliptic cylindrical polygon mirror and a double aspherical surface correction lens without using any f-θ lenses.

In addition, Jpn. Pat. Appln. KOKAI Publication No. 2-131212 proposes a technique of electrically correcting an f-θ error of the optical aberrations and optically correcting other aberrations.

As shown in FIG. 17, a laser beam from a semiconductor laser 1 is collimated by a collimator lens 2. The laser beam is then transmitted through a cylindrical lens 3 to be incident on a polygon mirror 4. The polygon mirror 4 is rotated by a motor to deflect and scan the incident laser beam.

The deflected beam from the polygon mirror 4 is transmitted through a toroidal lens 5 and is reflected by reflecting mirrors 6 and 7 to be focused on a photosensitive drum 8. At the same time, the laser beam is scanned along a main scanning line 9 of the photosensitive drum 8.

In this case, the laser beam is scanned along the main scanning line 9 at different scanning speeds at a central portion and end portions of the line 9. That is, the scanning speed at end portions is higher than that at the central portion.

Owing to such a difference in scanning speed, if a laser beam is ON/OFF-controlled at a constant timing to expose a charge portion on the photosensitive drum 8, the pitch of dots formed by the ON/OFF operation of the laser beam becomes larger at the end portions than at the central portion.

In order to solve such a problem, in the invention disclosed in Jpn. Pat. Appln. KOKAI Publication No. 2-131212, the entire area of the main scanning lines 9 is divided into equal parts at the middle point of the line, and each half area is divided into seven blocks a to g.

As shown in FIG. 18, a reference clock having a frequency 10 times higher than that of a printing clock is used in such a manner that in each of the blocks a to g, the ratio of dots each formed by 10 reference pulses to dots each formed by nine reference pulses is changed. That is, the dot printing timing is quickened toward the end portions of the main scanning line 9 to make the dot pitches from the central portion to the end portions uniform macroscopically.

If, however, a uniform dot pitch is to be achieved by simply changing the ratio of dots each formed by 10 pulses to dots each formed by nine pulses, as in this official gazette, vertical moirs are produced between adjacent lines scanned by a laser beam, because dots each formed by 10 pulses and dots each formed by nine pulses, formed on adjacent lines, are aligned with each other.

SUMMARY OF THE INVENTION

It is an object of the present invention to prevent the generation of vertical moirs in a system for electrically correcting f-θ errors.

According to a first aspect of the invention, there is provided an optical scanning apparatus for applying a laser beam onto imaging surface to record the image data thereon in units of dots, wherein the width of each of dots to be formed in one scanning operation is determined from dot-width data item which is used to correct an f-θ error caused by a change in speed of the scanning operation, and a period of applying the laser beam onto the imaging surface is changed in accordance with the dot-width data item, the apparatus characterized by comprising: storage means having addresses for storing dot-width data items which form a plurality of pattern data items, each consisting of representing widths of dots forming a line to be formed in one scanning operation; data read means for selecting and reading the dot-width data items forming a pattern data item for each scanning operation; dot width determining means for determining the widths of the dots to be formed in the scanning operation, from the dot-width data items read from the storage means by the data read means; and control means for controlling the period for applying the laser onto the imaging surface in accordance with each dot width determined by the dot width determining means.

According to a second aspect of this invention, there is provided an optical scanning apparatus for applying a laser beam onto imaging surface to record the image data thereon in units of dots, wherein the width of each of dots to be formed in one scanning operation is determined from dot-width data item which is used to correct an f-θ error caused by a change in speed of the scanning operation, and a period of applying the laser beam onto the imaging surface is changed in accordance with the dot-width data item, the apparatus characterized by comprising: storage means for storing dot-width data items representing widths of dots forming a line longer than a line to be formed in one scanning operation, by a length of a line formed of a predetermined number of dots; data read means for reading all or some of the dot-width data from the storage means for each scanning operation; dot width determining means for determining the widths of the dots to be formed in the scanning operation, from the dot-width data items read from the storage means by the data read means; and control means for controlling the period for applying the laser onto the imaging surface in accordance with each dot width determined by the dot width determining means.

According to a third aspect of the present invention, there is provided an optical scanning apparatus for applying a laser beam onto imaging surface to record the image data thereon in units of dots, wherein the width of each of dots to be formed in one scanning operation is determined from dot-width data item which is used to correct an f-θ error caused by a change in speed of the scanning operation, and a period of applying the laser beam onto the imaging surface is changed in accordance with the dot-width data item, the apparatus characterized by comprising: storage means having addresses for storing dot-width data items representing widths of dots forming a line longer than half the length of a line to be formed in one scanning operation, by a length of a line formed of a predetermined number of dots; data read means, first for designating some of the addresses of the storage means in decreasing order of the address number, in response to pixel clock pulses, and reading the dot-width data items from the addresses thus designated, to thereby provide data representing the widths of dots forming a first half of the line formed in the scanning operation, and then for designating the addresses of the storage means in increasing order of address number, in response to pixel clock pulses, and reading the dot-width data items from the addresses thus designated, to thereby provide data representing the widths of dots forming the remaining half of the line formed in the same scanning operation; detection means for detecting start of each scanning operation; presenting means for presetting the start address which the data read means designates during a period between the time when the detection means detects the start of each scanning operation and the application of a first laser beam in the scanning operation, and for replacing the address with the start address for the immediately following scanning operation; pixel clock generating means for changing a width of a pixel clock pulse in accordance with the dot-width data items read from the storage means; and control means for controlling the period for applying the laser onto the imaging surface in accordance with the dot-width data item.

According to a fourth aspect of this invention, there is provided an optical scanning apparatus for applying a laser beam onto imaging surface to record the image data thereon in units of dots, wherein the width of each of dots to be formed in one scanning operation is determined from dot-width data item which is used to correct an f-θ error caused by a change in speed of the scanning operation, and a period of applying the laser beam onto the imaging surface is changed in accordance with the dot-width data item, the apparatus characterized by comprising: storage means having addresses for storing dot-width data items representing widths of dots forming a line longer than half the length of a line to be formed in one scanning operation, by a length of a line formed of a predetermined number of dots; data read means, first for designating some of the addresses of the storage means in increasing order of the address number, in response to pixel clock pulses, and reading the dot-width data items from the addresses thus designated, to thereby provide data representing the widths of dots forming a first half of the line formed in the scanning operation, and then for designating the addresses of the storage means in decreasing order of address number, in response to pixel clock pulses, and reading the dot-width data items from the addresses thus designated, to thereby provide data representing the widths of dots forming the remaining half of the line formed in the same scanning operation; detection means for detecting start of each scanning operation; presetting means for presetting the start address which the data read means designates during a period between the time when the detection means detects the start of each scanning operation and the application of a first laser beam in the scanning operation, and for replacing the address with the start address for the immediately following scanning operation; pixel clock generating means for changing a width of a pixel clock pulse in accordance with the dot-width data items read from the storage means; and control means for controlling the period for applying the laser onto the imaging surface in accordance with the dot-width data item.

According to a fifth aspect of the invention, there is provided an optical scanning apparatus for applying a laser beam onto imaging surface to record the image data thereon in units of dots, wherein the width of each of dots to be formed in one scanning operation is determined from dot-width data item which is used to correct an f-θ error caused by a change in speed of the scanning operation, and a period of applying the laser beam onto the imaging surface is changed in accordance with the dot-width data item, the apparatus characterized by comprising: storage means having addresses for storing dot-width data items which form a plurality of pattern data items, each consisting of representing widths of dots forming a half of a line to be formed in one scanning operation; data read means, first for designating those of the addresses of the storage means which store dot-width data items forming a selected one of the pattern data items, in increasing order of the address number and reading the dot-width data items from the addresses thus designated, to thereby provide data representing the widths of dots forming a first half of the line formed in the scanning operation, and then for designating the addresses of those of the addresses of the storage means in decreasing order of address number and reading the dot-width data items from the addresses thus designated, to thereby provide data representing the widths of dots forming the remaining half of the line formed in the same scanning operation; detection means for detecting start of each scanning operation; presetting means for presetting the start address which the data read means designates during a period between the time when the detection means detects the start of each scanning operation and the application of a first laser beam in the scanning operation, and for replacing the address with the start address of the immediately following scanning operation such that the dot-width data items forming another pattern data item are read in the immediately following scanning operation; pixel clock generating means for changing a width of a pixel clock pulse in accordance with the dot-width data items read from the storage means; and control means for controlling the period for applying the laser onto the imaging surface in accordance with the dot-width data item.

According to a sixth aspect of the present invention, there is provided an optical scanning apparatus for applying a laser beam onto imaging surface to record the image data thereon in units of dots, wherein the width of each of dots to be formed in one scanning operation is determined from dot-width data item which is used to correct an f-θ error caused by a change in speed of the scanning operation, and a period of applying the laser beam onto the imaging surface is changed in accordance with the dot-width data item, the apparatus characterized by comprising: storage means having addresses for storing dot-width data items which form a plurality of pattern data items, each consisting of representing widths of dots forming a half of a line to be formed in one scanning operation; data read means, first for designating those of the addresses of the storage means which store dot-width data items forming a selected one of the pattern data items, in decreasing order of the address number and reading the dot-width data items from the addresses thus designated, to thereby provide data representing the widths of dots forming a first half of the line formed in the scanning operation, and then for designating the addresses of those of the addresses of the storage means in increasing order of address number and reading the dot-width data items from the addresses thus designated, to thereby provide data representing the widths of dots forming the remaining half of the line formed in the same scanning operation; detection means for detecting start of each scanning operation; presetting means for presetting the start address which the data read means designates during a period between the time when the detection means detects the start of each scanning operation and the application of a first laser beam in the scanning operation, and for replacing the address with the start address of the immediately following scanning operation such that the dot-width data items forming another pattern data item are read in the immediately following scanning operation; pixel clock generating means for changing a width of a pixel clock pulse in accordance with the dot-width data items read from the storage means; and control means for controlling the period for applying the laser onto the imaging surface in accordance with the dot-width data item.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 is a plan view showing the first embodiment without a housing;

FIG. 2 is a sectional view taken along a line A—A in FIG. 1;

FIG. 3 is a view showing a scanning range on an imaging surface in the first embodiment;

FIG. 4 is a graph showing the relationship between the change in scanning speed and the maximum positional error in the first embodiment;

FIG. 5 is a graph showing the relationship between the scanning position, the divided blocks, and the maximum positional error in the first embodiment;

FIG. 6 is a chart showing a sync signal and a print/scanning range in the first embodiment;

FIG. 7 is a block diagram showing a control circuit in the first embodiment;

FIGS. 11A and 11B are views showing f-θ correction pulse width data patterns in the first embodiment;

FIG. 12 is a view showing another f-θ correction pulse width data pattern stored in an f-θ correction pulse width data storage area;

FIG. 13 is a block diagram showing a control circuit in the second embodiment;

DETAILED DESCRIPTION OF THE PREFERRED EMBODIMENTS

First Embodiment

Figure 8:
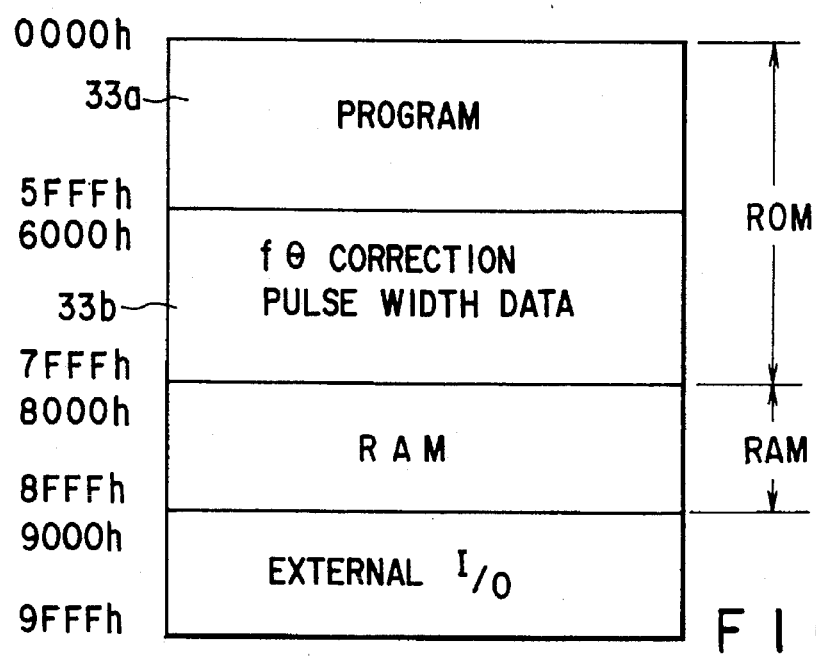
FIG. 8 is a chart showing addresses in a memory section in the first embodiment.

This embodiment has an arrangement shown in FIGS. 1 and 2.

A semiconductor laser oscillator 11 having a laser diode emits a laser beam.

The laser beam from the semiconductor laser oscillator 11 is transmitted through a convergent lens 12 and a slit 13 and is reflected by a reflecting mirror 14.

The convergent lens 12 converts the transmitted laser beam into a divergent light beam. The slit 13 forms the transmitted laser beam into a circular beam.

The reflecting mirror 14 reflects the laser beam and changes its optical path by a right angle, thereby radiating the laser beam on a reflecting surface of a rectangular prism 16 disposed on a rotating shaft 15b of a rotor 15a of a scanner motor 15.

The rectangular prism 16 has two side surfaces as right-angled triangles and three rectangular surfaces. Of the three rectangular surfaces, two surfaces which are perpendicular to each other are set as reflecting surfaces. The rectangular prism 16 is bonded on the rotating shaft 15b of the scanner motor 15 while the center of the remaining one surface is aligned with the rotating shaft 15b.

The laser beam reflected by the reflecting mirror 14 is incident on the rectangular prism 16, at a position separated from the center of the rotating shaft 15b of the scanner motor 15 by several mm, so as to be parallel to the rotating shaft 15b. The laser beam is then reflected by one of the reflecting surfaces of the rectangular prism 16 rotated by the scanner motor 15.

The scanner motor 15 has a magnet 15c integrally mounted on the rotor 15a.

The rotating shaft 15b is rotatably mounted on a stator member 15d through a ball bearing 15e.

A circuit board 15g is fixed to the stator member 15d through a spacer 15f.

A coil 15h is mounted on the lower surface of the circuit board 15g at a position opposite to the magnet 15c.

The rectangular prism 16 reflects the laser beam reflected by the reflecting mirror 14 to deflect and scan the laser beam in a planar direction perpendicular to the rotating shaft 15b of the scanner motor 15.

A meniscus lens 17 is designed such that the curvature radius of the exit surface is smaller than that of the incident surface, and the surface on the imaging surface side is curved outward. The meniscus lens 17 is arranged near the rectangular prism 16 to focus the deflected laser beam from the rectangular prism 16 onto the photosensitive surface of a photosensitive drum as an imaging surface.

A light emission unit 18 integrally houses the semiconductor laser oscillator 11, the convergent lens 12, and the slit 13.

A case 19 houses the meniscus lens 17.

A housing 20 consists of, e.g., a synthetic resin. The light emission unit 18 is fitted in the rear upper portion of the housing 20. The reflecting mirror 14 is embedded in an inclined portion of the front upper portion of the housing 20. The case 19 is fitted in a front opening portion of the housing 20 to be fixed thereto with screws.

The flange portion of the housing 20 is screwed to the edge portion of the stator member 15d of the scanner motor 15.

As shown in FIG. 3, the deflected laser beam from the rectangular prism 16 is reflected by a reflecting mirror 22 disposed at a position slightly separated from one end of the print range of an imaging surface 21. The deflected laser beam reflected by this reflecting mirror 22 is radiated on a synchronization sensor 23 for detecting the start of an optical scanning operation.

The scanning speed of a laser beam on the imaging surface 21 increases from the central portion to an end portion, as shown in FIG. 4.

Assume that the deflection angle of the rectangular prism 16 is 90°, the thickness, curvature radius of incident surface, and curvature radius of exit surface the meniscus lens 17 are 7 mm, −67.0 mm, and −25.8 mm, respectively, and the distance between the rotating shaft 15b of the scanner motor 15 and the imaging surface 21 is 168.1 mm. In this case, the scanning range, of a deflected laser beam, corresponding to the print range is about ±110 mm with the center being set to be 0.

When a clock is set such that the maximum field angle is obtained at a position separated from the center by 110 mm, the scanning speed near the scanning position of 65 mm corresponds to the average scanning speed.

This average scanning speed is defined as a reference scanning speed.

A printing clock is set on the basis of this reference scanning speed. In addition, an optical system is set such that pixels coincide with normal positions at the center and the ends of the print range.

With this setting, actual print dots at positions near the center are dense toward the center with respect to normal dot positions, and the maximum positional error occurs at a position near the scanning position of 65 mm. An actual print dot gradually comes closer to a corresponding normal position toward an end of the print range, and an actual print dot coincides with a normal position at the scanning position of 110 mm.

A curve g in FIG. 4 indicates the relationship between the scanning position of an actual print dot and the maximum positional error with respect to the corresponding normal position.

This positional error is called an f-θ error. In order to digitally correct this f-θ error, the scanning distance (110 mm) from the center to the end of the print range is divided into areas of five blocks b1 to b5, as shown in FIG. 5.

The lengths of the blocks b1 to b5 are set to be 40 mm, 18 mm, 16 mm, 18 mm, and 18 mm, respectively.

When one scanning width of the print range is 220 mm, and the resolution is 300 dpi, one scanning operation corresponds to 2598 dots.

Therefore, the block b1 corresponds to 473 dots; the block b2, 212 dots; the block b3, 189 dots; the block b4, 213 dots; and block b5, 212 dots.

In this case, the pixel width of each pixel (dot) is determined by, e.g., a reference clock having a frequency 16 times as high as that of a pixel clock.

When this reference clock is used, the block b1 is designed such that the ratio of dots, each formed by 16 reference clocks, is set to be $1/18$, and the ratio of dots, each formed by 15 reference clocks is set to be $17/18$.

In the block b2, the ratio of dots, each formed by 15 reference clocks, is set to be ½, and the ratio of dots, each formed by 14 reference clocks, is set to be ½.

In the block b3, one dot is formed by 14 reference clocks.

In the block b4, the ratio of dots, each formed by 14 reference clocks, is set to be ⅓, and the ratio of dots, each formed by 13 reference clocks, is set to be ⅔.

In the block b5, the ratio of dots, each formed by 13 reference clocks, is set to be ⅓, and the ratio of dots, each formed by 12 reference clocks, is set to be ⅔.

By defining each pixel width, i.e., each print dot width, in accordance with the above-described rule, an f-θ error in the case wherein the resolution is 300 dpi can be digitally corrected.

The synchronization sensor 23 detects a scanning start for every scanning operation and outputs a sync signal S for determining a scanning start position, as shown in FIG. 6.

Assume that the paper size is A4, and the resolution is 300 dpi. In this case, the number of print dots in the print range between a given sync signal S and the next sync signal S is 2,598.

In one scanning operation, dot printing from one end to the center is performed in the order of the blocks b5, b4, b3, b2, and b1, whereas dot printing from the center to the other end is performed in the order of the blocks b1, b2, b3, b4, and b5.

FIG. 7 is a block diagram showing the arrangement of a control section. A CPU (central processing unit) 31 constitutes the main portion of the control section. A RAM (random access memory) 32 constitutes a work area and the like with which the CPU 31 executes programs. A ROM (read only memory) 33 serves to store program data, which are used by the CPU 31 to control the respective components, and pulse width data for correcting an f-θ error.

A control circuit 34 controls the overall system including the scanner motor 15 and the like. A bus switching circuit 35 performs switching between an address bus line 36 and a data bus line 37.

The RAM 32, the control circuit 34, and the bus switching circuit 35 are electrically connected to the CPU 31 through the address bus line 36 and the data bus line 37.

As shown in FIG. 8, the ROM 33 is constituted by a memory defined by addresses "0000 h" to "7FFF h". Of addresses "0000 h" to "7FFF h", addresses "0000 h" to "5FFF h" define a program storage area 33a, and addresses "6000 h" to "7FFF h" define an f-θ correction pulse width data storage area 33b.

The RAM 32 is constituted by a memory defined by addresses "8000 h" to "8FFF h".

Remaining addresses "9000 h" to "9FFF h" are assigned to an external I/O.

The bus switching circuit 35 is electrically connected to the ROM 33 through the address bus line 36 and the data bus line 37. The bus switching circuit 35 is electrically connected to an address counter 38 through the address bus line 36. The bus switching circuit 35 is electrically connected to a latch circuit 39 through the data bus line 37.

A line counter 40 starts a counting operation in response to the sync signal S from the synchronization sensor 23. A count output from the line counter 40 is supplied to the address counter 38.

The latch circuit 39 latches pulse width data read out from the ROM 33. A latched output from the latch circuit 39 is supplied to a programmable counter 41.

The programmable counter 41 counts reference clocks from a reference clock oscillator 42 on the basis of the data from the latch circuit 39, and controls input image data in accordance with the count result. The programmable counter 41 then outputs image data having a length based on the pulse width data. The image data from the programmable counter 41 is supplied to an LD driver 43 for driving the laser diode of the semiconductor laser oscillator 11.

The bus switching circuit 35, the address counter 38, the latch circuit 39, the line counter 40, the programmable counter 41, the reference clock oscillator 42, and the LD driver 43 constitute a circuit for reading out data having a pattern different from a preceding pattern from the f-θ correction pulse width data storage area 33b of the ROM 33 for each scanning operation and ON/OFF-controlling a laser beam.

Figure 9:
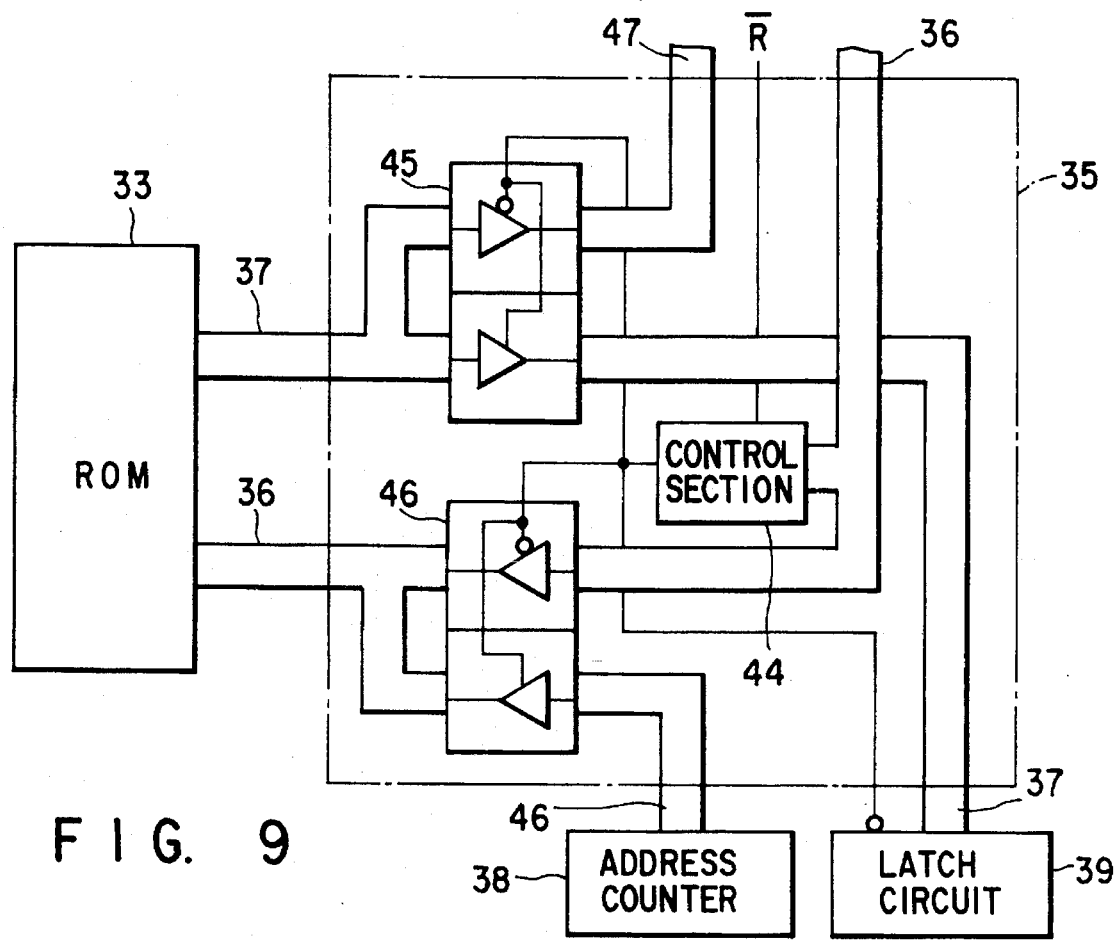
FIG. 9 is a block diagram showing the arrangement of a bus switching circuit in the first embodiment.

As shown in FIG. 9, the bus switching circuit 35 includes a control section 44 and switches 45 and 46.

The control section 44 controls the switches 45 and 46 on the basis of a read signal R and address data from the CPU 31. The switch 45 is controlled by the control section 44 to connect the data bus line 37 from the ROM 33 to the data bus line 37 on the CPU 31 side or on the latch circuit 39 side. The switch 46 is controlled by the control section 44 to connect the address bus line 36 from the ROM 33 to the address bus line 36 on the CPU 31 side or on the address counter 38 side.

Figure 10:
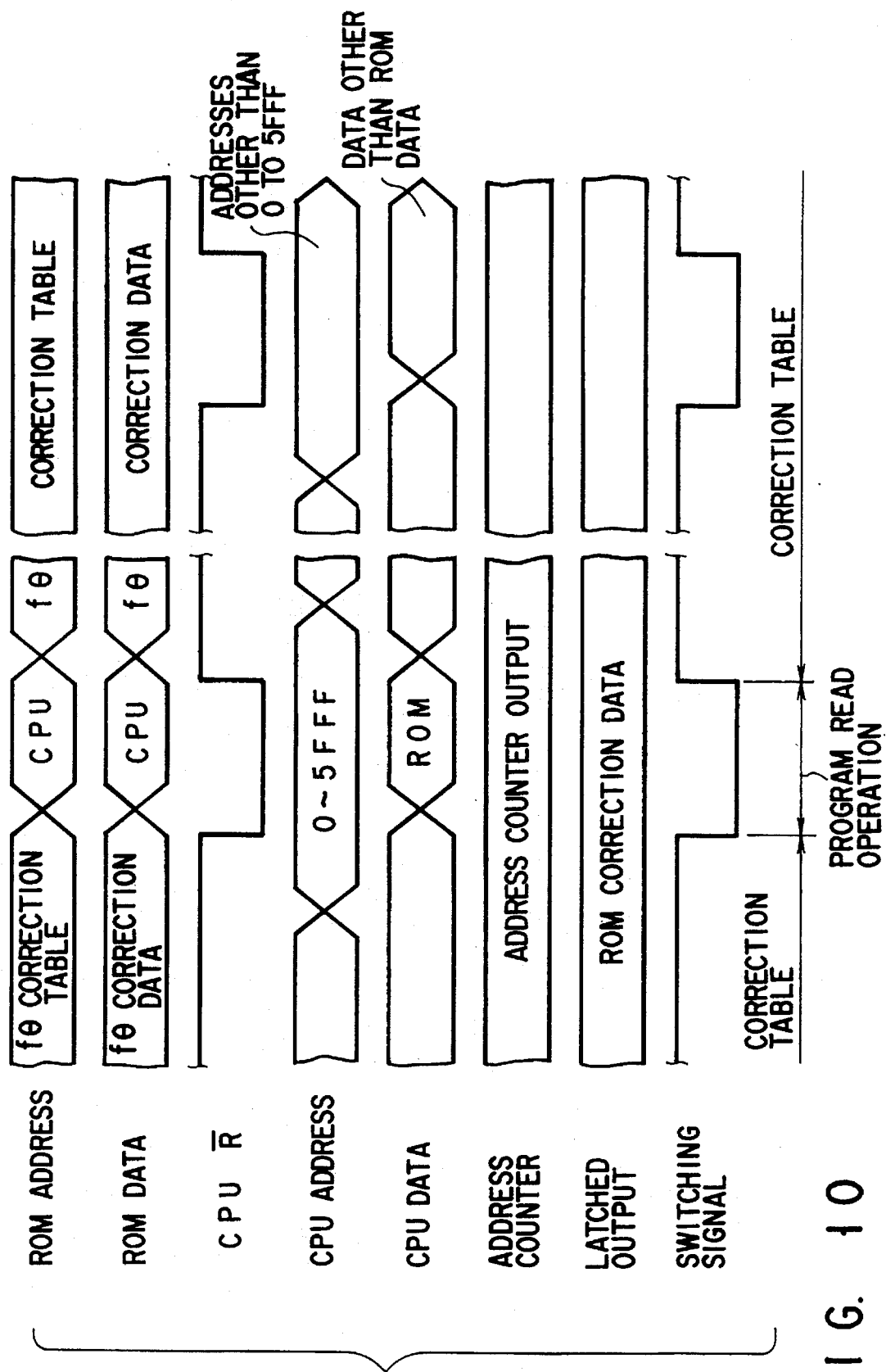
FIG. 10 is a timing chart showing bus switching control performed by the bus switching circuit in the first embodiment.

As shown in FIG. 10, when the read signal (switching signal) R from the CPU 31 is at low level, the bus switching circuit 35 controls the switches 45 and 46 to connect the address bus line 36 and the data bus line 37 from the ROM 33 to the address bus line 36 and the data bus line 37 on the CPU 31 side, thereby allowing the CPU 31 to access addresses "0000 h" to "5FFF h".

When the read signal (switching signal) R is at high level, the bus switching circuit 35 controls the switches 45 and 46 to connect the address bus line 36 from the ROM 33 to the address counter 38 and also connect the data bus line 37 from the ROM 33 to the latch circuit 39. With this operation, data from the f-θ correction pulse width data storage area 33b of the ROM 33 can be output to the latch circuit 39 in accordance with the value indicated by the address counter 38.

For example, the f-θ correction pulse width data storage area 33b stores pulse width data for determining the width of a drive pulse for controlling each print dot in the print range in a scanning operation. Pulse width data of two different patterns are stored in the storage area 33b.

The operation of this embodiment will be described below.

A laser beam from the semiconductor laser oscillator 11 is converted into a divergent light beam by the convergent lens 12. The beam is then converted into a circular beam by the slit 13.

The laser beam converted into this circular beam is reflected by the reflecting mirror 14 such that its optical path is changed by a right angle. The laser beam is radiated on a reflecting surface of the rectangular prism 16 disposed on the rotating shaft 15b of the scanner motor 15.

The rectangular prism 16 is rotated by the motor 15 to deflect and scan the incident laser beam from the reflecting mirror 14 in a planar direction perpendicular to the rotating shaft 15b of the motor 15. The scanned/deflected laser beam is focused on the imaging surface 21 through the meniscus lens 17.

The laser beam is reflected by the reflecting mirror 22 at a position slightly separated from the print range and is incident on the synchronization sensor 23. With this operation, the synchronization sensor 23 outputs the sync signal S.

The line counter 40 starts a counting operation in response to the sync signal S. When the count value of the line counter 40 reaches a predetermined value, the address counter 38 starts address designation with respect to the ROM 33.

With this address designation, the pulse width data in the f-θ correction pulse width data storage area 33b are sequentially read out and latched by the latch circuit 39.

When the pulse width data are sequentially input to the latch circuit 39, the programmable counter 41 counts reference clocks from the reference clock oscillator 42 on the basis of the pulse width data in the latch circuit 39, and controls the width of each pixel of input image data. The programmable counter 41 then outputs each pixel clock for the image data to the LD driver 43.

The LD driver 43 ON/OFF-controls the laser diode of the semiconductor laser oscillator 11 for each pixel on the basis of each pixel clock for the image data.

When this control is performed for the print range in one scanning operation, i.e., for 2,598 pixels, data corresponding to one line is printed.

As f-θ correction pulse width data to be read out from the f-θ correction pulse width data storage area 33b, f-θ correction pulse width data having the pattern shown in FIG. 11A and f-θ correction pulse width data having the pattern shown in FIG. 11B are alternately selected. More specifically, the f-θ correction pulse width data having the pattern shown in FIG. 11A is read out when addresses 1 to 2,598 are designated. F-θ correction pulse width data having the pattern shown in FIG. 11B is read out when 2,599 to 5,196 are designated.

When the f-θ correction pulse width data having the pattern shown in FIG. 11A is read out, in the block b5, an output operation of forming one dot with 13 reference clocks is performed once at first, and an output operation of forming one dot with 12 reference clocks is then performed twice. Subsequently, this output control is repeated.

In the block b4, an output operation of forming one dot with 14 reference blocks is performed once at first, and an output operation of forming one dot with 13 reference clocks is then performed twice. Subsequently, this output control is repeated.

In the block b3, only an output operation of forming one dot with 14 reference clocks is repeatedly performed.

In the block b2, an output operation of forming one dot with 15 reference clocks and an output operation of forming one dot with 14 reference blocks are alternately repeated.

In the block b1, an output operation of forming one dot with reference to 16 reference clocks is performed once at first, and an output operation of forming one dot with 15 reference clocks is then performed 17 times. Subsequently, this output control is repeated.

In one scanning operation, output control is performed from one end to the center in the order of the blocks b5, b4, b3, b2, and b1, and is also performed from the center to the other end in the order of the blocks b1, b2, b3, b4, and b5.

When the one-line scanning operation is completed in this manner, output control for the next one line is performed by reading out the f-θ correction pulse width data having the pattern shown in FIG. 11B from the f-θ correction pulse width data storage area 33b.

In a scanning operation with respect to the next line, in the block b5, an output operation of forming one dot with 12 reference clocks is performed once at first, and an output operation of forming one dot with 13 reference clocks is then performed once. Thereafter, an output operation of forming one dot with 12 reference clocks is performed twice. Subsequently, an output operation of forming one dot with 13 reference clocks is performed once, and an output operations of forming one dot with 12 reference clocks is performed twice, which output control is repeated afterward.

In the blocks b4 to b1 and the blocks b1 to b5, output control is performed in accordance with the pattern shown in FIG. 11B.

With this operation, the print pattern of each dot of the next line is offset from that of the preceding line by one dot in the main scanning direction.

When printing of the next line is completed, a printing operation is performed by respect to the next one line. In this operation, output control is performed on the basis of the f-θ correction pulse width data having the pattern shown in FIG. 11A.

As described above, output control is performed by alternately reading out the f-θ correction pulse width data having the two patterns stored in the f-θ correction pulse width data storage area 33b for each line. Therefore, dots, of adjacent lines, which have the same pulse width are not set at the same position in the main scanning direction.

Consequently, the generation of vertical lines, i.e., vertical moirs, can be prevented, which are formed when dots, of adjacent lines, which have the same pulse width are set at the same position in the main scanning direction.

As a memory for storing f-θ correction pulse width data, the ROM 33 for storing program data is used, and the bus switching circuit 35 performs bus switching, only when the CPU 31 is to access the ROM 33, thus allowing the CPU 31 to access a program. In other cases, f-θ correction pulse width data is input to the latch circuit 39. With this operation, since a commercially available ROM can be used, a reduction in cost can be realized.

When the CPU 31 is to access the ROM 33, the bus switching circuit 35 performs bus switching. At this time, even if the count value of the address counter 38 is changed, f-θ correction pulse width data designed by the changed count value is not abruptly changed with respect to the f-θ correction pulse width data latched by the latch circuit 39.

Therefore, almost no problems are posed in output control which is performed by reading out the f-θ correction pulse width data designated by the value of the address counter 38 and latching the data in the latch circuit 39, after accessing of the CPU 31 to the ROM 33 is completed and the bus line is restored to the initial state by the bus switching circuit 35.

In the above-described embodiment, f-θ correction pulse width data of two patterns are stored in the f-θ correction pulse width data storage area 33b, and the respective patterns are selectively read out. However, three or more f-θ correction pulse width data patterns may be stored in the f-θ correction pulse width data storage area 33b to be selectively read out.

In addition, in the above embodiment, f-θ correction pulse width data of two patterns are stored in the ROM 33, and the two patterns are alternately read out for each line. However, for example, as shown in FIG. 12, f-θ correction pulse width data corresponding to a dot count of 2,599, which is larger than a dot count of 2,598 for one scanning operation, may be stored at addresses 0 to 2598 in the f-θ correction pulse width data storage area 33b, and the f-θ correction pulse width data at addresses 0 to 2597 and the f-θ correction pulse width data at addresses 1 to 2598 may be alternately read out for each line. In this manner, the f-θ correction pulse width data of the two patterns can be alternately read out for each line.

In this case, therefore, an offset of one dot is also caused between adjacent lines in the main scanning direction.

Consequently, similar to the above-described embodiment, the same pulse width is not set at the same position of adjacent lines in the main scanning direction, and hence the generation of vertical moirs can be prevented.

In addition, the amount of data stored in the ROM 33 may be set to be larger than that of f-θ correction pulse width data corresponding to one scanning operation by one dot. That is, the amount of data to be stored in the f-θ correction pulse width data storage area 33b can be reduced as compared with the embodiment. Therefore, the capacity of the f-θ correction pulse width data storage area 33b can be reduced.

Furthermore, f-θ correction pulse width data to be stored in the f-θ correction pulse width data storage area 33b may be set to have a pulse width larger than the dot count corresponding to one scanning operation by two or more dots, thereby setting f-θ correction pulse width data of three or more range patterns to be read out. With this setting, the f-θ correction pulse width data may selectively read out for each line in accordance with the respective range patterns so as to perform pulse width control with respect to the print dots of each line.

Second Embodiment

The arrangement of the apparatus of the second embodiment is the same as that shown in FIGS. 1 and 2.

Figure 14:
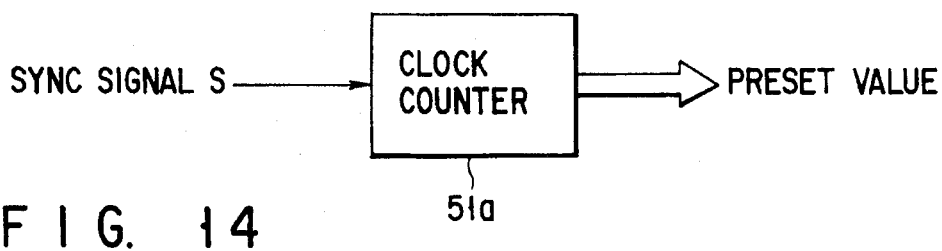
FIG. 14 is a circuit diagram showing the arrangement of a preset value generating circuit in the control circuit in the second embodiment.

Referring to FIG. 13, a preset value generating circuit 51 generates a preset value. The preset value generating circuit 51 is constituted by a clock counter 51a, as shown in FIG. 14.

The preset value generating circuit 51 supplies the preset value to an address generating circuit 52 in response to a sync signal S from a synchronization sensor 23.

Figure 15:
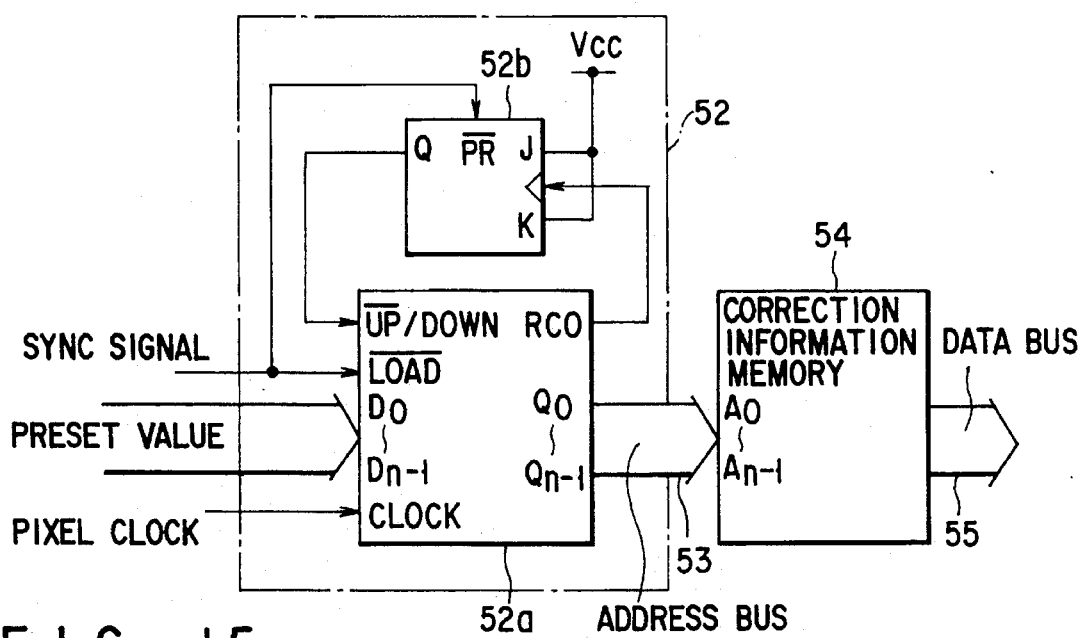
FIG. 15 is a circuit diagram showing the arrangement of an address generating circuit in the control circuit in the second embodiment.

As shown in FIG. 15, the address generating circuit 52 comprises an address counter 52a constituted by an up-down counter, and a JK flip-flop 52b. The preset value from the preset value generating circuit 51 is loaded in response to the sync signal S.

The address generating circuit 52 supplies the count value of the address counter 52a, as address data, to a correction information memory 54 through an address bus 53, thus performing address designation with respect to the memory 54.

The correction information memory 54 stores f-θ correction pulse width data representing a pulse width larger than that of the above-described f-θ correction pulse width data, which is used to determine a pixel clock period for each dot in the respective blocks b5 to b1, by a predetermined number of dots, e.g., one dot.

Upon address designation by the count value of the address counter 52a, the correction information memory 54 outputs corresponding f-θ correction pulse width data to a data bus 55.

The address value of the address counter 52a is preset in response to the sync signal S, and address data for designating f-θ correction pulse width data for determining a pixel clock period corresponding to the first dot in one scanning operation is generated in accordance with this address value.

When the address value is preset, the address counter 52a operates as a down counter which is operated in accordance with pixel clocks from a pixel clock generating circuit (to be described later). When the count value becomes zero, a carry output is sent from an output terminal RCO of the address counter 52a.

The carry output from the address counter 52a is input, as a clock, to the JK flip-flop 52b.

Upon reception of the carry output, the JK flip-flop 52b inverts an output from an output terminal Q and supplies the inverted output to the address counter 52a.

When the output from the output terminal Q of the JK flip-flop 52b is inverted, the address counter 52a operates as an up counter.

As shown in FIG. 13, the f-θ correction pulse width data read out from the correction information memory 54 is input to a pixel clock generating circuit 56.

The pixel clock generating circuit 56 receives a reference clock having a frequency 16 times that of a pixel clock corresponding to one dot on an imaging surface 21, and outputs a pixel clock having a period corresponding to a dot constituent ratio determined for each of the above-described blocks b1 to b5 on the basis of the f-θ correction pulse width data from the correction information memory 54.

The pixel clock generating circuit 56 supplies each pixel clock to the address generating circuit 52 and the latch circuit 57.

The latch circuit 57 receives each pixel clock from the pixel clock generating circuit 56 and image data of one pixel (dot) and outputs the image data of one pixel corresponding to the period of the pixel clock to a semiconductor laser oscillator 11.

The semiconductor laser oscillator 11 ON/OFF-drives the laser diode on the basis of the image data from the latch circuit 57. When the image data is "1", the laser diode is kept on for the period of the pixel clock. When the image data is "0", the laser diode is kept off for the period of the pixel clock.

The operation of this embodiment will be described below.

A laser beam from the semiconductor laser oscillator 11 is converted into a divergent light beam by a convergent lens 12, and is converted into a circular beam by a slit 13.

The laser beam converted into the circular beam is reflected by a reflecting mirror 14 such that its optical path is changed by a right angle. As a result, the laser beam is radiated on a reflecting surface of a rectangular prism 16 disposed on a rotating shaft 15b of a scanner motor 15.

The rectangular prism 16 is rotated by the motor 15 to deflect and scan the incident laser beam from the reflecting mirror 14 in a planar direction perpendicular to the rotating shaft 15b of the motor 15. The scanned/deflected laser beam is focused on the imaging surface 21 through a meniscus lens 17.

The laser beam is reflected by a reflecting mirror 22 at a position slightly separated from the print range and is incident on the synchronization sensor 23. With this operation, the synchronization sensor 23 outputs the sync signal S.

This sync signal S is supplied to the preset value generating circuit 51 and the address generating circuit 52.

In response to the sync signal S, the preset value generating circuit 51 supplies a preset value to the address generating circuit 52. In response to the sync signal S, the address generating circuit 52 sets the preset value, supplied from the preset value generating circuit 51, in the address counter 52a.

When the scanned laser beam approaches one end of the print range, the address generating circuit 52 outputs address data for reading out f-θ correction pulse width data for determining a drive pulse width corresponding to the first dot of the block b5 from the correction information memory 54.

The correction information memory 54 supplies f-θ correction pulse width data for forming one dot with, e.g., 12 reference clocks to the pixel clock generating circuit 56 in accordance with the address data from the address generating circuit 52.

The pixel clock generating circuit 56 outputs a pixel clock having a period corresponding to 12 reference clocks.

If, for example, the image of the first pixel (dot) is "1", the latch circuit 57 outputs a signal for causing the semiconductor laser oscillator 11 to perform an ON operation in accordance with the period of the input pixel clock. With this operation, the semiconductor laser oscillator 11 performs an ON operation the laser diode.

In this manner, the first dot of the block b5 as one end of the print range is irradiated with a laser beam by a width corresponding to 12 reference clocks.

Meanwhile, the address counter 52a of the address generating circuit 52 is decremented by one in response to the pixel clock from the pixel clock generating circuit 56. With this operation, the address to be designated is decremented by one.

Subsequently, the address generating circuit 52 outputs address data for reading out f-θ correction pulse width data for determining a drive pulse width corresponding to the second dot of the block b5 from the correction information memory 54.

Similar to the above-described case, the correction information memory 54 supplies the f-θ correction pulse width data for forming one dot with 12 reference clocks to the pixel clock generating circuit 56 in accordance with the address data from the address generating circuit 52.

With this operation, the pixel clock generating circuit 56 outputs a pixel clock having a period corresponding to 12 reference clocks.

If, for example, the image data of the next one pixel is also "1", the latch circuit 57 outputs a signal for causing the semiconductor laser oscillator 11 to perform an ON operation in accordance with the period of the input pixel clock. With this operation, the semiconductor laser oscillator 11 performs an ON operation of the laser diode.

The second dot of the block b5 is irradiated with a laser beam by a width corresponding to 12 reference clocks.

Meanwhile, the address counter 52a of the address generating circuit 52 is decremented by one in response to the pixel clock from the pixel clock generating circuit 56. With this operation, the address to be designated is decremented by one.

In this case, the address generating circuit 52 outputs address data for reading out f-θ correction pulse width data for determining a drive pulse width corresponding to the third dot of the block b5 from the correction information memory 54.

The correction information memory 54 supplies f-θ correction pulse width data for forming one dot with 13 reference clocks to the pixel clock generating circuit 56 in accordance with the address data from the address generating circuit 52.

With this operation, the pixel clock generating circuit 56 outputs a pixel clock having a period corresponding to 13 reference clocks.

If, for example, the image data of one pixel is also "1", the latch circuit 57 outputs a signal for causing the semiconductor laser oscillator 11 to perform an ON operation in accordance with the period of the input pixel clock. With this operation, the semiconductor laser oscillator 11 performs an ON operation of the laser diode.

In this manner, the third dot of the block b5 is irradiated with a laser beam by a width corresponding to 13 reference clocks.

Meanwhile, the address counter 52a of the address generating circuit 52 is decremented by one in response to the pixel clock from the pixel clock generating circuit 56. With this operation, the address to be designated is decremented by one.

In this manner, in the block b5, output control of printing is performed such that the ratio of dots, each formed by 13 reference clocks, is ⅔, and the ratio of dots, each formed by 13 reference clocks, is ⅓.

Similarly, in the block b4, output control of printing is performed such that the ratio of dots, each formed by 14 reference clocks, is ⅓, and the ratio of dots, each formed by 13 dots, is ⅔.

In the block b3, output control of printing is performed such that each dot is formed by 14 reference clocks.

In the block b2, output control of printing is performed such that the ratio of dots, each formed by 15 reference clocks, is ½, and the ratio of dots, each formed by 14 reference clocks, is ½.

In the block b1, output control of printing is performed such that the ratio of dots, each formed by 16 reference clocks, is ¹/₁₈, and the ratio of dots, each formed by 15 reference clocks, is ¹⁷/₁₈.

When output control is performed up to the block b1 in this manner, scanning from one end of the print range to the center is completed.

When the scanning position reaches the center of the print range, the address counter 52a sends a carry output from the output terminal RCO and supplies it, as a clock, to the JK flip-flop 52b.

In response to this clock, the JK flip-flop 52b is inverted.

When an output from the output terminal Q of the JK flip-flop 52b is inverted, the address counter 52a changes its function from a down counter to an up counter.

With this operation, the address, of the correction information memory 54, designated by the address counter 52a is changed to read out f-θ correction pulse width data in the order of the blocks b1, b2, b3, b4, and b5.

Consequently, output control of printing is performed this time to determine the print width of each pixel in a scanning operation from the center to the other end of the print range.

When f-θ correction pulse width data corresponding to the final pixel (dot) of the block b5 is read out from the correction information memory 54, the pixel clock generating circuit 56 generates a pixel clock based on the f-θ correction pulse width data.

When the semiconductor laser oscillator 11 performs an ON operation of the laser diode in accordance with the period of the pixel clock, one scanning operation is completed.

The next scanning operation is started when a laser beam is detected by the synchronization sensor 23 again.

At this time, the preset value generating circuit 51 also supplies a preset value to the address generating circuit 52 in response to the sync signal S. This preset value, however, is set to be larger than the preceding preset value by, e.g., "1".

With this setting, in the next scanning operation, for example, a dot formed by 12 reference clocks is set at the same position as that of a dot formed by 13 reference clocks in the preceding scanning operation.

That is, in the next scanning operation, f-θ correction pulse width data for determining each pixel clock period is read out from the correction information memory 54 according to a range pattern different from that in the preceding scanning operation.

In this manner, the range patterns of f-θ correction pulse width data for determining pixel clock periods are alternately switched such that dots, of adjacent lines, which have the same print width are not set at the same position, thereby preventing pixels, of adjacent lines, which have the same width from being set at the same position in the main scanning direction. With this operation, the generation of vertical moirs can be prevented.

In addition, one scanning line is divided into halves, and pixel clocks for the respective dots corresponding to one scanning operation, i.e., scanning from one end of the scanning line to the center and from the center to the other end, are generated by commonly using the f-θ correction pulse width data stored in the correction information memory 54 and used to determine the pixel clock periods of the respective dots. Therefore, the amount of data to be stored in the correction information memory 54 is substantially ½ that required for one scanning operation.

Since the amount of data to be stored can be reduced to substantially ½, the memory capacity of the correction information memory 54 can be reduced.

In the second embodiment, the address counter 52a is operated as a down counter first, and then as an up counter. Subsequently, this switching operation is repeated. In contrast to this, however, the address counter 52a may be operated as an up counter first, and then as a down counter. Subsequently, this switching operation may be repeated.

Figure 16:
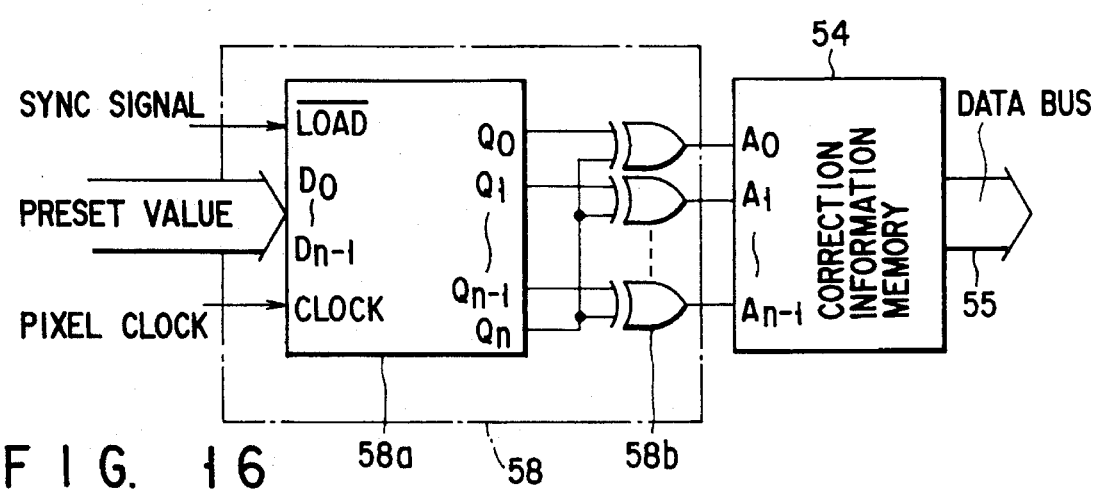
FIG. 16 is a circuit diagram showing another address generating circuit in the control circuit in the second embodiment.
Figure 17:
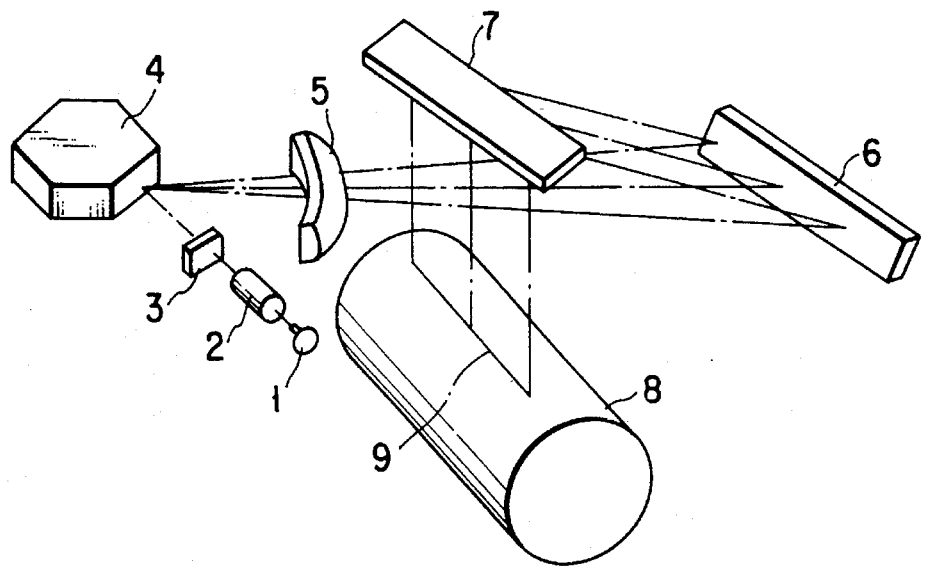
FIG. 17 is a perspective view showing a conventional system.
Figure 18:
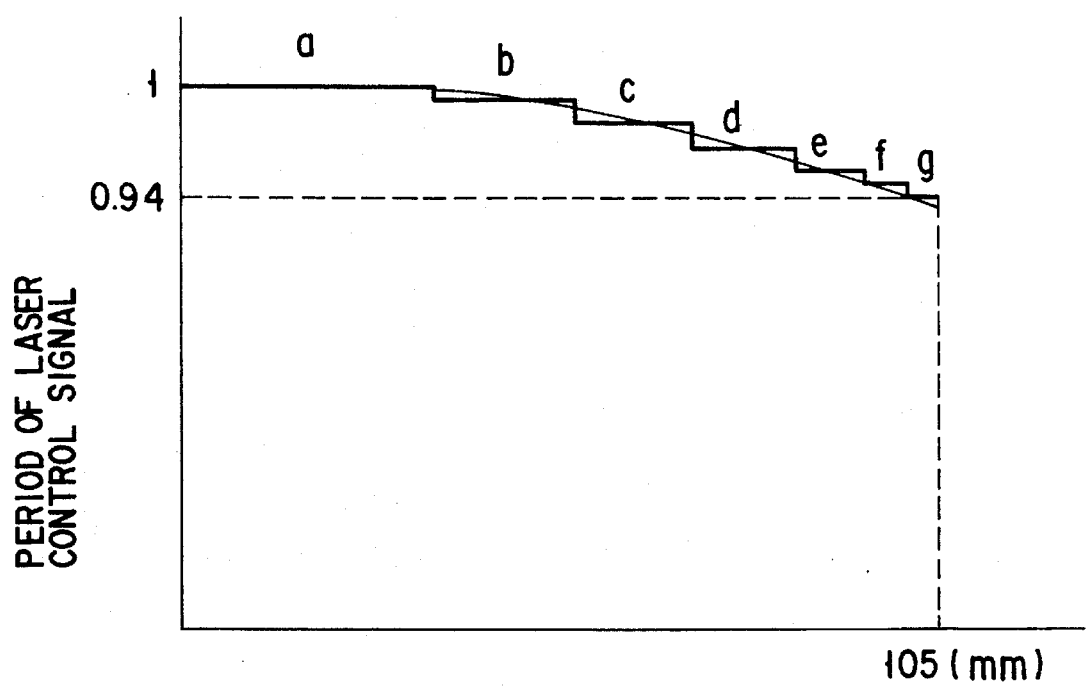
FIG. 18 is a graph showing the period of a laser control signal as a function of a scanning position in the conventional system.

In the second embodiment, the address generating circuit 52 comprises the address counter 52a and the JK flip-flop 52b. However, the same control as that described above can be performed by using an address generating circuit 58 comprising an address counter 58a and a logic circuit 58b constituted by a plurality of exclusive OR gates, as shown in FIG. 16.

The address counter 58a of the address generating circuit 58 has output terminals Q0 to Qn which are larger in number than the signal lines of the address bus of the correction information memory 54. The address generating circuit 58 calculates the exclusive OR between each of outputs from the output terminals Q0 to Qn-1 and an output from the output terminal Qn as the most significant bit, and inputs them to the address bus of the correction information memory 54.

The address generating circuit 58 sets a preset value in the address counter 58a in response to the sync signal S. The present value is set such that when the scanning position moves from one end of the print range and approaches the center, the most significant bit is set to "1"

With this setting, when the scanning position moves from one end of the print range and approaches the center, an output from the output terminal Qn of the address counter 58a of the address generating circuit 58 is set to "1", and an output from each exclusive OR gate is inverted.

Inverting an output from each exclusive OR gate is equivalent to complementing "1". That is, as the count value of the address counter 58a is incremented one by one, an address input to the correction information memory 54 is decremented one by one.

For this reason, the same function and effect as those obtained by the use of the address generating circuit 52 can be obtained by the use of the address generating circuit 58, because the data in the correction information memory 54 can be read out twice in different address directions in the first half and second half of one scanning operation.

Note that an address generating circuit can be realized by a software arrangement as well as a hardware arrangement.

In the second embodiment, f-θ correction pulse width data which corresponds to a length larger than a half of data corresponding to one scanning operation by one dot is stored in the correction information memory 54, and f-θ correction pulse width data, each corresponding to a length corresponding to a half of one scanning operation, are alternately read out from the correction information memory 54, for each scanning operation, according to two different range patterns. However, f-θ correction pulse width data which represents a pulse width larger than a half of data corresponding to one scanning operation by two or more dots may be stored in the correction information memory 54, and f-θ correction pulse width data, each corresponding to a length corresponding to a half of one scanning operation, may be selectively read out from the correction information memory 54, for each scanning operation, according to three or more different range patterns.

In the second embodiment, f-θ correction pulse width data which has a pulse width larger than a half of data corresponding to one scanning operation by one dot is stored in the correction information memory 54, and f-θ correction pulse width data, each corresponding to a length corresponding to a half of one scanning operation, are alternately read out from the correction information memory 54, for each scanning operation, according to two different range patterns. However, f-θ correction pulse width data of a plurality of patterns, each corresponding to a length corresponding to a half of one scanning operation, may be stored in the correction information memory 54, and the f-θ correction pulse width data of the respective patterns may be selectively read out from the correction information memory 54 for each scanning operation, thereby controlling the pixel clock period of the respective lines.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An optical scanning apparatus for applying a laser beam onto an imaging surface to record image data thereon in units of dots, wherein a width of each of dots to be formed in one scanning operation is determined from a dot-width data item which is used to correct an f-θ error caused by a change in speed of the scanning operation, and wherein a period of applying the laser beam onto said imaging surface is changed in accordance with the dot-width data item, said optical scanning apparatus comprising:

storage means having addresses for storing dot-width data items which form a plurality of pattern data items, each pattern data item including data representing widths of dots forming a line to be formed in one scanning operation;

data read means for selecting and reading the dot-width data items forming a pattern data item for each scanning operation;

dot width determining means for determining the widths of the dots to be formed in the scanning operation, from the dot-width data items read from said storage means by said data read means; and control means for controlling the period for applying the laser beam onto said imaging surface in accordance with each dot width determined by said dot width determining means.

2. An apparatus according to claim 1, wherein:

said storage means stores two pattern data items; and said data read means reads the two pattern data items alternately from said storage means, for two consecutive scanning operations.

3. An optical scanning apparatus for applying a laser beam onto an imaging surface to record image data thereon in units of dots, wherein a width of each of dots to be formed in one scanning operation is determined from a dot-width data item which is used to correct an f-θ error caused by a change in speed of the scanning operation, and wherein a period of applying the laser beam onto said imaging surface is changed in accordance with the dot-width data item, said optical scanning apparatus comprising:

storage means for storing dot-width data items representing widths of dots forming a line longer than a line to be formed in one scanning operation, by a length of a line formed of a predetermined number of dots;

data read means for reading all or some of the dot-with data items from said storage means for each scanning operation;

dot width determining means for determining the widths of the dots to be formed in the scanning operation, from the dot-width data items read from said storage means by said data read means; and control means for controlling the period for applying the laser beam onto said imaging surface in accordance with each dot width determined by said dot width determining means.

4. An apparatus according to claim 3, wherein:

said predetermined number of dots is 1; and said data read means reads all of the dot-width data items stored in said storage means or all of dot-width data items except a first dot-width data item.

5. An optical scanning apparatus for applying a laser beam onto an imaging surface to record image data thereon in units of dots, wherein a width of each of dots to be formed in one scanning operation is determined from a dot-width data item which is used to correct an f-θ error caused by a change in speed of the scanning operation, and wherein a period of applying the laser beam onto said imaging surface is changed in accordance with the dot-width data item, said optical scanning apparatus comprising:

storage means having addresses for storing dot-width data items representing widths of dots forming a line longer than half the length of a line to be formed in one scanning operation, by a length of a line formed of a predetermined number of dots;

data read means, first for designating some of the addresses of said storage means in a decreasing order of address number, in response to pixel clock pulses, and reading the dot-width data items from the addresses of decreasing order thus designated, to thereby provide data representing the width of dots forming a first half of the line formed in the scanning operation, and then for designating the addresses of said storage means in an increasing order of address number, in response to pixel clock pulses, and reading the dot-width data items from the addresses of increasing order thus designated, to thereby provide data representing the widths of dots forming a remaining half of the line formed in the same scanning operation;

detection means for detecting a start of each scanning operation;

presetting means for presetting a start address which said data read means designates during a period between a time when said detection means detects the start of each scanning operation and the application of a first laser beam in the scanning operation, and for replacing the preset start address with a start address of an immediately following scanning operation;

pixel clock generating means for changing a width of a pixel clock pulse in accordance with the dot-width data items read from said storage means; and control means for controlling the period for applying the laser beam onto said imaging surface in accordance with the dot-width data item.

6. An apparatus according to claim 5, wherein said predetermined number of dots forming the line is 1.

7. An apparatus according to claim 5, wherein:

said data read means comprises an address counter and a JK flip-flop; and said address counter first operates as a down counter for reading from said storage means the dot-width data items which represent the widths of dots forming a first half of the line formed in the scanning operation, and then operates as an up counter for reading from said storage means the dot-width data items which represent the widths of dots forming a first half of the line formed in the scanning operation.

8. An optical scanning apparatus for applying a laser beam onto an imaging surface to record image data thereon in units of dots, wherein a width of each of dots to be formed in one scanning operation is determined from a dot-width data item which is used to correct an f-θ error caused by a change in speed of the scanning operation, and wherein a period of applying the laser beam onto said imaging surface is changed in accordance with the dot-width data item, said optical scanning apparatus comprising:

storage means having addresses for storing dot-width data items representing widths of dots forming a line longer than half the length of a line to be formed in one scanning operation, by a length of a line formed of a predetermined number of dots;

data read means, first for designating some of the addresses of said storage means in an increasing order of address number, in response to pixel clock pulses, and reading the dot-width data items from the addresses of increasing order thus designated, to thereby provide data representing the width of dots forming a first half of the line formed in the scanning operation, and then for designating the addresses of said storage means in a decreasing order of address number, in response to pixel clock pulses, and reading the dot-width data items from the addresses of decreasing order thus designated, to thereby provide data representing the widths of dots forming a remaining half of the line formed in the same scanning operation;

detection means for detecting a start of each scanning operation;

presetting means for presetting a start address which said data read means designates during a period between a time when said detection means detects the start of each scanning operation and the application of a first laser beam in the scanning operation, and for replacing the preset start address with the start address of an immediately following scanning operation;

pixel clock generating means for changing a width of a pixel clock pulse in accordance with the dot-width data items read from said storage means; and control means for controlling the period for applying the laser beam onto said imaging surface in accordance with the dot-width data item.

9. An apparatus according to claim 8, wherein said predetermined number of dots forming the line is 1.

10. An apparatus according to claim 8, wherein:

said data means comprises an address counter and a JK flip-flop; and said address counter first operates as a down counter for reading from said storage means the dot-width data items which represent the widths of dots forming a first half of the line formed in the scanning operation, and then operates as an up counter for reading from said storage means the dot-width data items which represent the widths of dots forming a first half of the line formed in the scanning operation.

11. An apparatus according to claim 8, wherein:

said data read means comprises an address counter and a plurality of exclusive OR gates; and said address counter first operates as an up counter for reading from said storage means the dot-width data items which represent the widths of dots forming a first half of the line formed in the scanning operation, and then operates as a down counter for reading from said storage means the dot-width data items which represent the widths of dots forming a first half of the line formed in the scanning operation.

12. An optical scanning apparatus for applying a laser beam onto an imaging surface to record image data thereon in units of dots, wherein a width of each of dots to be formed in one scanning operation is determined from a dot-width data item which is used to correct an f-θ error caused by a change in speed of the scanning operation, and wherein a period of applying the laser beam onto said imaging surface is changed in accordance with the dot-width data item, said optical scanning apparatus comprising:

storage means having addresses for storing dot-width data items which form a plurality of pattern data items, each pattern data item including data representing widths of dots forming a half of a line to be formed in one scanning operation;

data read means, first for designating those of the addresses of said storage means which store dot-width data items forming a selected one of said pattern data items, in an increasing order of address number, and reading the dot-width data items from the addresses of increasing order thus designated, to thereby provide data representing the widths of dots forming a first half of the line formed in the scanning operation, and then for designating the addresses of those of the addresses of said storage means in a decreasing order of address number, and reading the dot-width data items from the addresses of decreasing order thus designated, to thereby provide data representing the widths of dots forming a remaining half of the line formed in the same scanning operation;

detection means for detecting a start of each scanning operation;

presetting means for presetting a start address which said data read means designates during a period between a time when said detection means detects the start of each scanning operation and the application of a first laser beam in the scanning operation, and for replacing the preset start address with the start address of an immediately following scanning operation such that the dot-width data items forming another pattern data item are read in the immediately following scanning operation;

pixel clock generating means for changing a width of a pixel clock pulse in accordance with the dot-width data items read from said storage means; and control means for controlling the period for applying the laser beam onto said imaging surface in accordance with the dot width data item.

13. An optical scanning apparatus for applying a laser beam onto an imaging surface to record image data thereon in units of dots, wherein a width of each of dots to be formed in one scanning operation is determined from a dot-width data item which is used to correct an f-θ error caused by a change in speed of the scanning operation, and wherein a period of applying the laser beam onto said imaging surface is changed in accordance with the dot-width data item, said optical scanning apparatus comprising:

storage means having addresses for storing dot-width data items which form a plurality of pattern data items, each pattern data item including data representing widths of dots forming a half of a line to be formed in one scanning operation;

data read means, first for designating those of the addresses of said storage means which store dot-width data items forming a selected one of said pattern data items, in a decreasing order of address number, and reading the dot-width data items from the addresses of decreasing order thus designated, to thereby provide data representing the widths of dots forming a first half of the line formed in the scanning operation, and then for designating the addresses of those of the addresses of said storage means in an increasing order of address number, and reading the dot-width data items from the addresses of increasing order thus designated, to thereby provide data representing the widths of dots forming a remaining half of the line formed in the same scanning operation;

detection means for detecting a start of each scanning operation;

presetting means for presetting a start address which said data read means designates during a period between a time when said detection means detects the start of each scanning operation and the application of a first laser beam in the scanning operation, and for replacing the preset start address with the start address of an immediately following scanning operation such that the dot-width data items forming another pattern data item are read in the immediately following scanning operation;

pixel clock generating means for changing a width of a pixel clock pulse in accordance with the dot-width data items read from said storage means; and control means for controlling the period for applying the laser beam onto said imaging surface in accordance with the dot width data item.

* * * * *

UNITED STATES PATENT AND TRADEMARK OFFICE
CERTIFICATE OF CORRECTION

PATENT NO. : 5,548,321
DATED : August 20, 1996
INVENTOR(S) : Kazunori MURAKAMI et al.

It is certified that error appears in the above-indentified patent and that said Letters Patent is hereby corrected as shown below:

Title Page, Item [56] References Cited, under "U.S. PATENT DOCUMENTS", insert

```
  --4,888,492    12/1989    Arimoto
    4,813,046    3/1989     Shimada
    5,019,913    5/1991     Kiya et al.--
```

Title Page, under "FOREIGN PATENT DOCUMENTS", insert

```
  --DE 40 31 052    11/1991    Germany--.
```

Signed and Sealed this

Fifteenth Day of April, 1997

Attest:

BRUCE LEHMAN

Attesting Officer     Commissioner of Patents and Trademarks